(12) United States Patent
Zhao et al.

(10) Patent No.: US 11,789,317 B1
(45) Date of Patent: Oct. 17, 2023

(54) BACKLIGHT MODULE AND DISPLAY DEVICE

(71) Applicant: HKC CORPORATION LIMITED, Shenzhen (CN)

(72) Inventors: Junyi Zhao, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/088,785

(22) Filed: Dec. 27, 2022

(30) Foreign Application Priority Data

Aug. 23, 2022 (CN) .......................... 202211011543.4

(51) Int. Cl.
*G02F 1/1335* (2006.01)
*G02F 1/13357* (2006.01)

(52) U.S. Cl.
CPC .. *G02F 1/133628* (2021.01); *G02F 1/133603* (2013.01); *G02F 1/133608* (2013.01)

(58) Field of Classification Search
CPC ......... G02F 1/133385; G02F 1/133628; G02F 2201/36; H05K 7/20145
See application file for complete search history.

(56) References Cited

U.S. PATENT DOCUMENTS

| | | | |
|---|---|---|---|
| 9,861,007 B2 * | 1/2018 | Yoon | H05K 7/2099 |
| 10,485,147 B2 * | 11/2019 | Oh | H05K 7/2099 |
| 2008/0101065 A1 | 5/2008 | Hsu et al. | |
| 2012/0120631 A1 | 5/2012 | Zhang | |
| 2018/0088368 A1 * | 3/2018 | Notoshi | G02B 6/0085 |
| 2018/0259806 A1 * | 9/2018 | Oh | G06F 1/1601 |
| 2019/0289754 A1 * | 9/2019 | Hubbard | G02F 1/133308 |
| 2020/0012143 A1 | 1/2020 | Wang et al. | |

FOREIGN PATENT DOCUMENTS

| | | |
|---|---|---|
| CN | 201322255 Y | 10/2009 |
| CN | 102566105 A | 7/2012 |
| CN | 102661533 A | 9/2012 |
| CN | 102818193 A | 12/2012 |
| CN | 204300865 U | 4/2015 |
| CN | 205643963 U | 10/2016 |
| CN | 106154646 A | 11/2016 |
| CN | 206906826 U | 1/2018 |
| CN | 110515240 A | 11/2019 |
| CN | 209879206 U | 12/2019 |
| CN | 212658916 U | 3/2021 |

(Continued)

OTHER PUBLICATIONS

Zhang, Cheng, the ISA written comments, Apr. 2023. CN.
Zhang, Cheng, the International Search Report, Apr. 2023, CN.

*Primary Examiner* — Andrew J Coughlin

(57) ABSTRACT

A backlight module and a display device are disclosed. The backlight module includes a framework, a light plate, and a plurality of lamp beads. The framework includes a light plate mounting groove. At least two sides of the framework define heat dissipation ports. The light plate is installed in the light plate mounting groove. A cavity is defined inside the light plate, and the cavity communicates with the heat dissipation port. The lamp beads are disposed on the light plate, and pins of the lamp beads extend into the cavity. The framework and the light plate jointly form a supporting structure of the backlight module.

18 Claims, 3 Drawing Sheets

(56) References Cited

FOREIGN PATENT DOCUMENTS

| | | | |
|---|---|---|---|
| CN | 212749470 | U | 3/2021 |
| CN | 213399140 | U | 6/2021 |
| CN | 113109970 | A | 7/2021 |
| CN | 113219719 | A | 8/2021 |
| CN | 1113467127 | A | 10/2021 |
| CN | 114187832 | A | 3/2022 |
| CN | 114285243 | A | 4/2022 |
| CN | 216526643 | U | 5/2022 |
| CN | 114660851 | A | 6/2022 |
| CN | 114677917 | A | 6/2022 |
| CN | 216697684 | U | 6/2022 |
| CN | 115113439 | A | 9/2022 |
| KR | 20100011875 | A | 2/2010 |
| KR | 20110104833 | A | 9/2011 |
| KR | 20120049069 | A | 5/2012 |
| TW | 200615640 | A | 6/2006 |
| WO | 12013071648 | A1 | 5/2013 |
| WO | 2013143156 | A1 | 10/2013 |
| WO | 2018183772 | A1 | 11/2016 |
| WO | 2021254035 | A1 | 12/2021 |

\* cited by examiner

BACKLIGHT MODULE AND DISPLAY DEVICE

CROSS-REFERENCE TO RELATED APPLICATIONS

This application claims the priority and benefit of Chinese patent application number 2022110115434, titled "Backlight Module and Display Device" and filed Aug. 23, 2022 with China National Intellectual Property Administration, the entire contents of which are incorporated herein by reference.

TECHNICAL FIELD

The present application relates to the field of display technology, and more particularly relates to a backlight module and a display device.

BACKGROUND

The description provided in this section is intended for the mere purpose of providing background information related to the present application but doesn't necessarily constitute prior art.

Liquid crystal display has undergone many years of development, and so the technology is relatively mature. However, as the market demands for ultra-thin, high color gamut, and low power consumption are becoming increasingly strong, screen manufacturers are also actively responding to these demands, striving to produce more competitive products. Displays using Mini LED can achieve better overall ultra-thinness, high dynamic range (HDR) imaging performance, higher contrast, more partitions, and low power consumption. Their display effect is comparable to that of OLED (Organic Light Emitting Diode), bringing consumers a very high viewing experience and bringing more diverse display consumption choices to the market.

Since LEDs generate more heat when they are in operation, and the heat generated by LEDs mainly comes from LED pins, this will easily lead to increased power consumption and reduced service life of the backlight module. Therefore, how to effectively dissipate heat from the pins of the LED to reduce the power consumption of the backlight module and improve the service life of the backlight module is one of the major obstacles to the development of Mini LED display technology.

SUMMARY

In view of the above, it is therefore a purpose of the present application to provide a backlight module and a display device, so as to reduce the power consumption of the backlight module and increase the service life of the backlight module.

This application discloses a backlight module. The backlight module includes a framework, at least one light plate and a plurality of lamp beads. The framework includes at least one light plate mounting groove. At least two sides of the framework corresponding to the mounting groove of the light plate define heat dissipation ports, and the heat dissipation ports go through the side walls of the framework. The light plates are arranged in one-to-one correspondence with the light plate mounting grooves, and are fixed in the light plate mounting grooves. The interior of each light plate is hollowed out to form a cavity, and the cavity communicates with the heat dissipation port in the framework. The lamp beads are arranged on the light plate, and the pins of the lamp beads extend into the cavity. The framework and the at least one light plate form a supporting structure of the backlight module.

This application further discloses a backlight module. The backlight module includes a framework, a plurality of light plates and a plurality of lamp beads. The framework includes a plurality of light plate mounting grooves. Each light plate mounting groove is a through groove, which runs through the framework. The framework includes a frame portion and a skeleton portion. The skeleton portion is composed of a plurality of crisscross branches. The frame portion is arranged around the skeleton portion. The four sides of the frame portion define heat dissipation ports corresponding to the positions of the light plate mounting grooves. Each of the branches defines an air channel, and the air channel penetrates the two sides of the branch corresponding to the light plate mounting groove. The heat dissipation port, the air channel and the cavity form a heat dissipation channel. The light plates are arranged in one-to-one correspondence with the light plate mounting grooves, and are fixed in the light plate mounting grooves. The light plate includes a top plate, a support member, and a bottom plate. The support member is disposed between the top plate and the bottom plate, and is connected with the top plate and the bottom plate, so that the cavity is formed between the top plate and the bottom plate. The lamp beads are arranged on the top plate, and the pins of the lamp beads extend through the top plate into the cavity. The framework and the light plate form a supporting structure of the backlight module.

This application further discloses a display device. The display device includes a display panel and a backlight module. The backlight module provides backlight for the display panel. The backlight module includes a framework, at least one light plate and a plurality of lamp beads. The framework defines at least one light plate mounting groove. At least two sides of the framework corresponding to the mounting groove of the light plate define heat dissipation ports, and the heat dissipation ports go through the side walls of the framework. The light plates are disposed in one-to-one correspondence with the light plate mounting grooves, and are fixed in the light plate mounting grooves. The interior of the light plate is hollowed out to form a cavity, and the cavity communicates with the heat dissipation ports in the framework. The lamp beads are arranged on the light plate, and the pins of the lamp beads extend into the cavity. The framework and the light plate form a supporting structure of the backlight module.

Compared with the current design of the backlight module in which the light plate is built on the back plate and the back plate is used to dissipate heat from the light plate, in this application, the back plate structure is omitted in the backlight module, and an additional structure namely the framework for fixing the light plate is added, so that the light plate in combination with the framework is used as the supporting structure of the backlight module. Further, heat dissipation ports are defined in different sides of the framework, and hollow structures are defined in the light plate to form cavities that communicate with these heat dissipation ports to form an air flow channel connected to the outside world, so that the external airflow can enter from one heat dissipation port, and come out from another heat dissipation port through the cavity, so as to achieve the effect of air circulation. In this way, the heat dissipation port air outside can directly take away the heat on the light plate and the heat extending to the pins in the cavity, effectively dissipating heat from the pins of the lamp beads, thereby achieving the purpose of reducing the power consumption of the backlight module and improving the service life of the backlight module.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

DETAILED DESCRIPTION OF EMBODIMENTS

Figure 1:
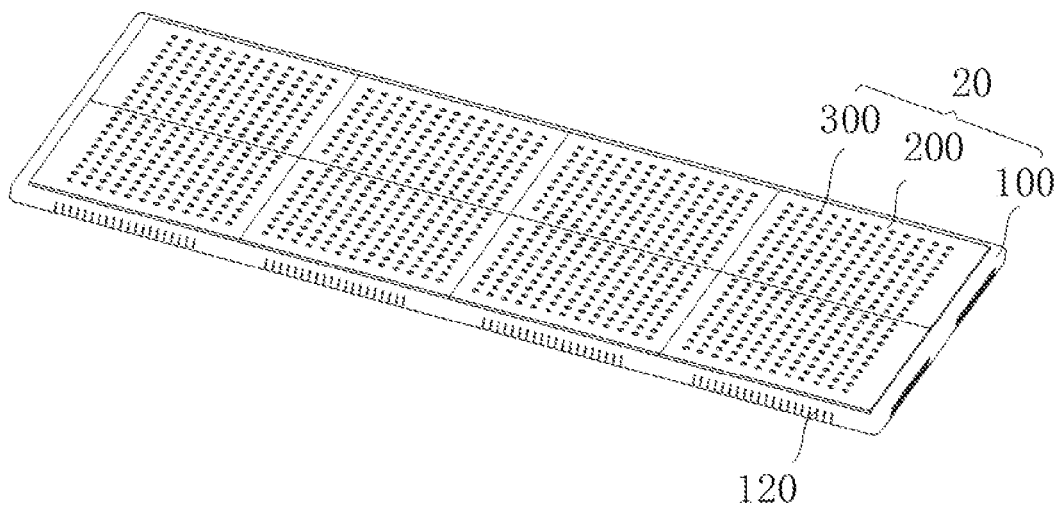
FIG. 1 is a schematic diagram of a backlight module provided by an embodiment of the present application.

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. In addition, terms "center", "transverse", "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

Hereinafter this application will be described in further detail with reference to the accompanying drawings and some optional embodiments.

Figure 2:
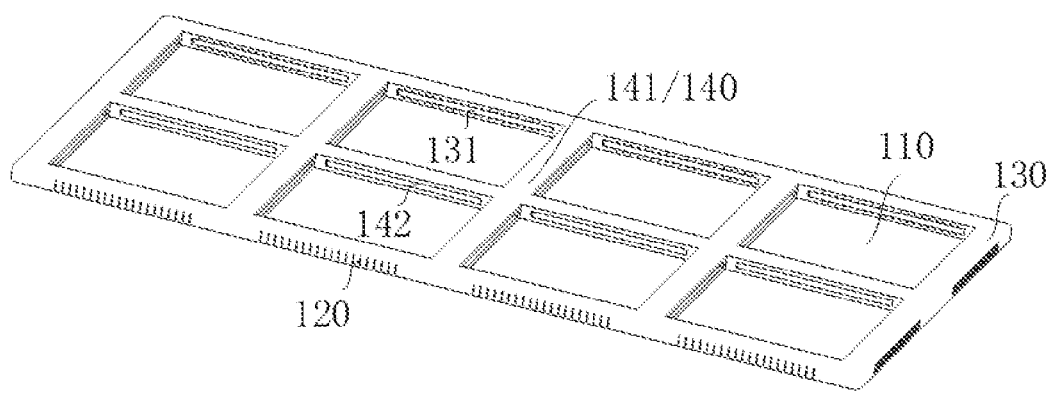
FIG. 2 is a schematic diagram of a framework provided by the embodiment of the present application.
Figure 4:
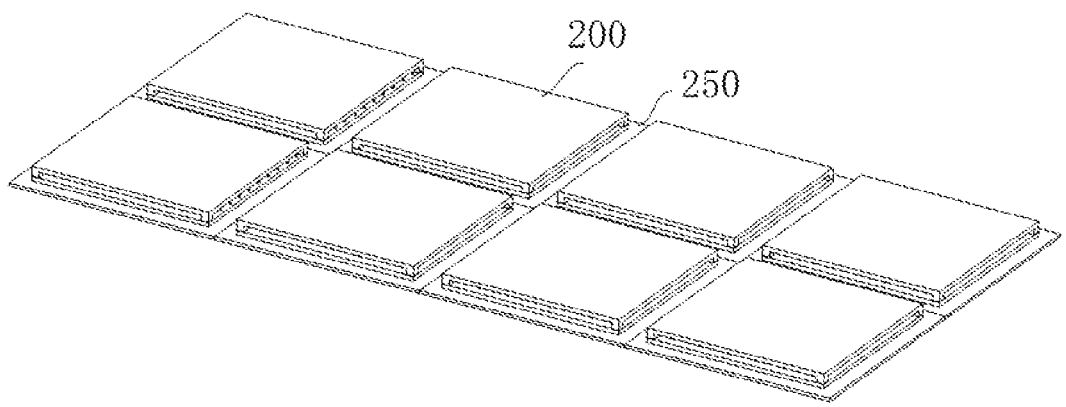
FIG. 4 is a schematic diagram of a light plate provided by an embodiment of the present application.

As shown in FIGS. 1, 2 and 4, embodiments of the present application disclose a backlight module 20 adopting a direct type backlight design. The backlight module 20 includes a framework 100, a light plate 200, lamp beads 300, and other structures. The framework 100 includes a light plate mounting groove 110 for fixing the light plate 200. At least two sides of the framework 100 corresponding to the light plate mounting groove 110 define heat dissipation ports 120. That is, at least two sides of the framework 100 define heat dissipation ports 120, where the at least two sides may be two sides, three sides or four sides. Furthermore, each heat dissipation port 120 penetrates the respective sidewall of the framework 100.

The interior of the light plate 200 is hollowed out to form a cavity 210, and the cavity 210 is in communication with at least two heat dissipation ports 120 in the framework 100. The lamp beads 300 are disposed on the light plate 200, and the pins 310 of the lamp beads 300 extend into the cavity 210. The framework 100 and the light plate 200 jointly form a supporting structure of the backlight module 20.

Compared with the current design of the backlight module 20 in which the light plate 200 is built on the back plate and the back plate is used to dissipate heat from the light plate 200, in this application the back plate structure is omitted in the backlight module 20, and an additional structure namely the framework 100 for fixing the light plate 200 is added, so that the light plate 200 in combination with the framework 100 is used as the supporting structure of the backlight module 20, namely the back structure of the backlight module 20. Further, heat dissipation ports 120 are defined in different sides of the framework 100, and hollow structures are defined in the light plate 200 to form cavities 210 that communicate with these heat dissipation ports 120 to form an air flow channel connected to the outside world, so that the external airflow can enter from one heat dissipation port 120, and come out from another heat dissipation port 120 through the cavity 210, so as to achieve the effect of air circulation. In this way, the heat dissipation port air outside can directly take away the heat on the light plate 200 and the heat extending to the pins 310 in the cavity 210, effectively dissipating heat from the pins 310 of the lamp beads 300, thereby achieving the purpose of reducing the power consumption of the backlight module 20 and improving the service life of the backlight module 20.

In the embodiments of the present application, the number of light plates 200 in the backlight module 20 may be only one. In this case, there is only one light plate mounting groove 110 in the framework 100, and the cavity 210 in the light plate 200 directly communicates with all the heat dissipation ports 120 in the framework 100 to form an airflow channel. The number of light plates 200 in the backlight module 20 can also be multiple, where the multiple here refers to two or more. Correspondingly, the framework 100 also has a plurality of light plate mounting grooves 110 and the light plates 200 are installed in the light plate mounting grooves 110 in one-to-one correspondence. In this case, the cavities 210 in all the light plates 200 communicate with each other, and form an air flow channel with the heat dissipation ports 120 in the framework 100. In this embodiment, the backlight module 20 has eight light plates 200 as an example for illustration, but it does not mean that the backlight module 20 with eight light plates 200 is preferably used in this embodiment.

Each light plate 200 includes a plurality of lamp beads 300, where these lamp beads 300 may be ordinary LED lamp beads 300 or Mini LED lamp beads 300, which are not to be limited here.

As shown in FIG. 2, in the framework 100, the light plate mounting groove 110 is a through groove, which runs through the framework 100. In this case, the framework 100 is a grid structure. Specifically, the framework 100 includes a frame portion 130 and a skeleton portion 140. The skeleton portion 140 is composed of a plurality of crisscross branches 141. The frame portion 130 is a square ring structure, which is disposed around the skeleton portion 140. At least two sides of the frame portion 130 define the heat dissipation ports 120 at positions corresponding to the light plate mounting grooves 110. Each of the branches 141 defines an air channel 142, and the air channel 142 penetrates the two sides of the branch 141 corresponding to the mounting grooves 110 of the light plate. The heat dissipation port 120, the air channel 142 and the cavity 210 collectively form a heat dissipation channel.

Of course, the light plate mounting groove 110 may also be a blind groove, that is, the light plate mounting groove 110 does not penetrate the framework 100, and this design does not affect the air flow in the heat dissipation channel. But relatively speaking, after the light plate mounting groove 110 is made as a through groove or slot more precisely, the bottom of the light plate 200 is exposed directly from the framework 100, so that the light plate 200 as the bottom of the backlight module 20 is directly exposed to the outside world, making it easier to dissipate heat.

Further, the interior of the framework 100 is hollowed. That is, in the framework 100, both the skeleton portion 140 and the frame portion 130 are hollow structures. In this case, the insides of all the branches 141 in the framework 100 are connected, and the cavities 210 in the light plates 200 are also connected. That means the inner spaces of the whole framework 100 and all the light plates 200 are connected. In this way, the external airflow can flow through the insides of the framework 100 and all the light plates 200 to take away the heat from each area, so that the backlight module 20 can dissipate heat evenly.

Figure 3:
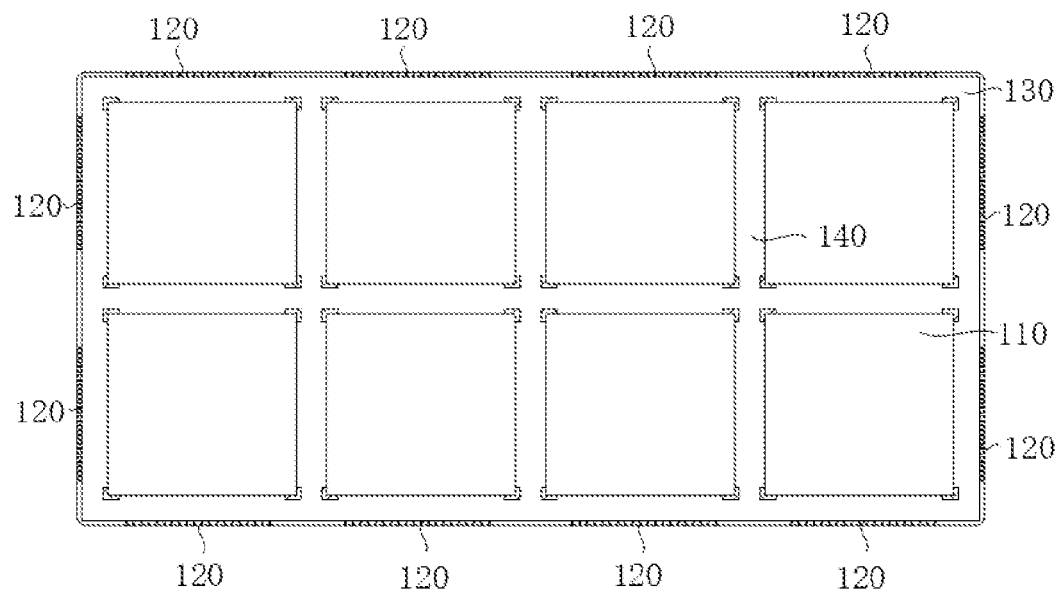
FIG. 3 is a cross-sectional view along a horizontal direction of a framework provided by an embodiment of the present application.

Furthermore, as shown in FIG. 3, when the frame portion 130 is a hollow structure, correspondingly, the heat dissipation ports 120 are defined in the four outer sides of the frame portion 130, and the heat dissipation ports 120 on each side are disposed corresponding to the light plates 200. Each heat dissipation port 120 is disposed on a respective side of the frame portion 130 away from the frame portion 140. In addition, the heat dissipation ports 120 are each a porous structure and are arranged in an array to prevent external dust and foreign matter from entering the interior of the backlight module 20. The side of the frame portion 130 facing the frame portion 140 is hollowed out to form a hollow portion 131, and the hollow portion 131 corresponds to a side of the respective cavity 210. After hollowing out the inside of the frame portion 130, the depth of the heat dissipation port 120 is smaller, and the outside air can fill and replace the air in the cavity of the light plate 200 more quickly to achieve better heat dissipation.

Optionally, the porous heat dissipation port 120 may be made into a conical structure, so that the cross-sectional area of the side of the heat dissipation port 120 facing the respective light plate 200 is larger than the cross-sectional area of the side of the heat dissipation port 120 facing the outside, that is, the cross-sectional area of the side facing away from the respective light plate 200. In this way, more air flows in from the outside, but less air enters the interior of the backlight module 20, which will form a negative pressure, so as to accelerate the entry of outside air into the backlight module 20, increase the air flow speed inside the backlight module 20, and improve heat dissipation efficiency.

The framework 100 is an integrally formed structure. That is, the frame portion 130 and the skeleton portion 140 are manufactured together or more specifically integrally, which can ensure that the framework 100 still has high strength and stability even though it is hollow inside. Furthermore, the framework 100 may be made of an aluminum alloy material. In this way, while reducing the cost of the framework 100 and reducing the weight of the framework 100, the framework 100 itself can also have better heat absorption and heat dissipation effects, and can accelerate the release of heat on the light plate 200, thereby further improving the overall heat dissipation effect of the backlight module 20. Of course, the framework 100 can also be made of other metals or other materials.

In the light plate 200, the design of the cavities 210 corresponds to the design of the heat dissipation ports 120 in the framework 100. When the heat dissipation ports 120 are only defined on two opposite sides of the framework 100, the cavities 210 are each a passage that runs through the light plate 200 in an orientation from front side to back side. When the heat dissipation ports 120 are defined on four sides of the framework 100, the cavities 210 are each a hollow structure with four open sides.

Figure 5:
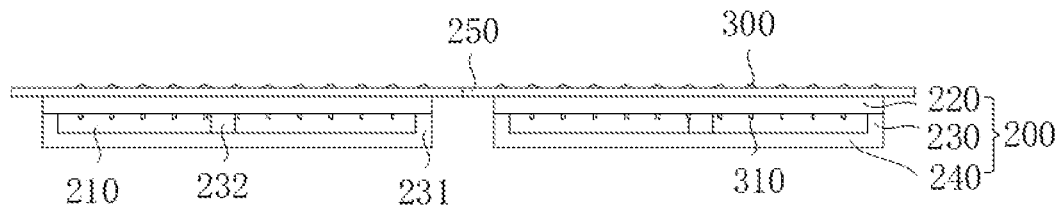
FIG. 5 is a cross-sectional view along a vertical direction of a backlight module provided by an embodiment of the present application.
Figure 6:
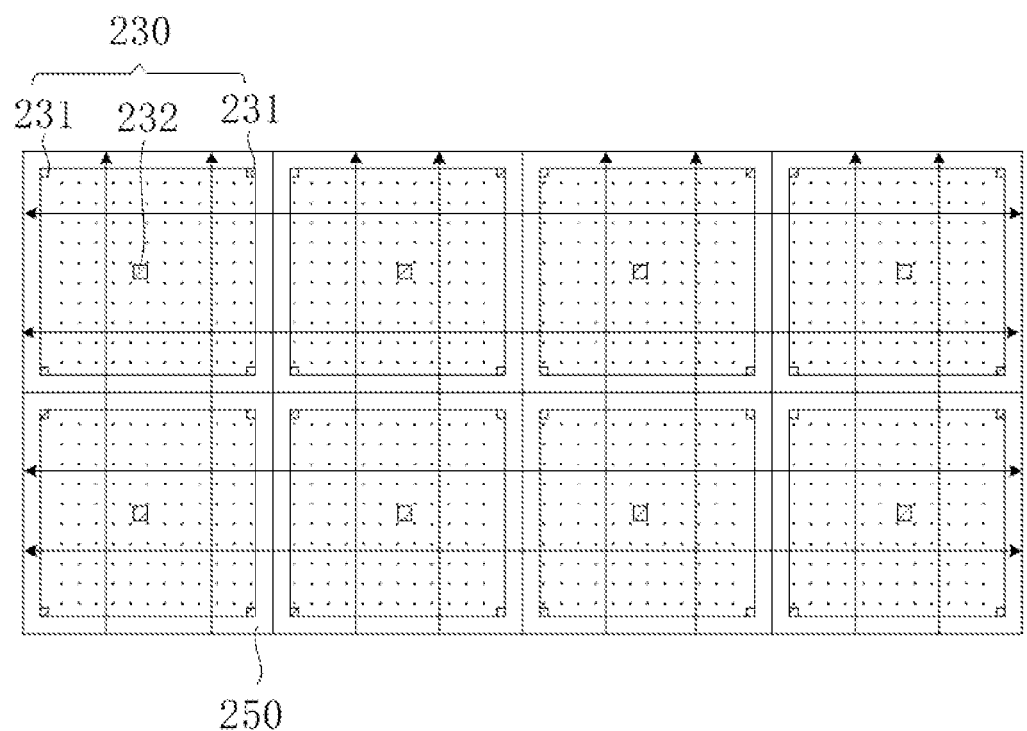
FIG. 6 is a cross-sectional view along a horizontal direction of a backlight module provided by an embodiment of the present application.

In this case, as shown in FIG. 4, FIG. 5 and FIG. 6, the light plate 200 includes a top plate 220, a support member 230 and a bottom plate 240. The support member 230 is located between the top plate 220 and the bottom plate 240 and is connected with the top plate 220 and the bottom plate 240 so that a cavity 210 is formed between the top plate 220 and the bottom plate 240. The pins 310 of the lamp bead 300 extend through the top plate 220 into the cavity 210. Furthermore, the light plate 200 adopts an integrated one piece design. That is, the top plate 220, the support member 230 and the bottom plate 240 are integrally formed, which not only facilitates the processing of the light plate 200, but also improves the stability of the light plate 200.

The support member 230 includes four corner support columns 231 and a central support column 232. The four corner support columns 231 respectively correspond to the four corners of the light plate 200 and respectively connect the four corners of the top plate 220 with the four corners of the bottom plate 240. The central support column 232 is located at the center of the light plate 200 and connects the center of the top plate 220 with the center of the bottom plate 240. The bottom plate 240 and the top plate 220 of each light plate 200 are supported and fixed at five points, so that the top plate 220 and the bottom plate 240 are prevented from being bent under force while ensuring the inner space of the light plate 200.

The horizontal section of each corner support column 231 may be a square. When the light plate 200 is inserted into the light plate mounting groove 110, the four corner support columns 231 of the light plate 200 just abut against the four corners of the light plate mounting groove 110 to position the light plate 200 and facilitate the installation of the light plate 200. The cross-section of the central support column 232 may be rectangular or circular, or other shapes.

After the light plate 200 is installed in the light plate mounting groove 110, the bottom of the light plate 200 is flush with the bottom of the framework 100. Since the light plate 200 and the framework 100 serve as the back of the backlight module 20, the flat structure is beneficial to the aesthetics of the backlight module 20. After the bottom of the light plate 200 is flush with the bottom of the framework 100, the gap between the bottom plate 240 and the framework 100 may be further filled with sealant, so as to improve the waterproof effect on the back of the backlight module 20 and the stability between the light plate 200 and the framework 100.

As shown in FIG. 6, after the light plate 200 is installed in the light plate mounting groove 110, the framework 100 and the light plate 200 form a plurality of heat dissipation channels, where the direction of the arrow in the FIG. indicates the direction of the air flow. After the air is heated and expanded, it drives the flow of air inside and outside the light plate 200.

The width of the cavity 210 is also the distance between two adjacent corner support columns 231 in the light plate 200. In this case, the width of the air channel 142 is not smaller than the width of the cavity 210, and the width of the hollow portion 131 in the frame portion 130 is not smaller than the width of the cavity 210, so that the framework 100 itself does not block the flow of air. Optionally, the cross-sectional shapes of the air channel 142, the cavity 210, and the hollow portion 131 are the same, and the three form a stable airflow channel, so that the air flows smoothly, which is beneficial to realize stable heat dissipation.

In the embodiments of the present application, the light plate 200 may be individually fixed to in the light plate mounting groove 110 in the framework 100; specifically, it may be fixed in a one-to-one correspondence by means of bonding, clamping or inserting. It is also possible to adopt a unified fixing method, namely first fix single or multiple light plates 200 together, and finally install it into the light plate mounting groove 110 in the framework 100. Specifically, the backlight module 20 further includes a cover plate 250. The top plates 220 of the plurality of light plates 200 are fixed onto the cover plate 250 in an array. The lamp beads 300 are fixed onto the cover plate 250, and the pins 310 of the lamp beads 300 extend through the cover plate 250 and the top plate 220 into the cavity 210. The bottoms of the edges of the cover plate 250 abut against the top of the frame portion 130 and are fixed on the frame portion 130 by means of adhesive. Alternatively, when there is only one light plate 200 in the backlight module 20, this light plate 200 can also be fixed onto the cover plate 250 first, and then the light plate 200 may be installed in the framework 100 by bonding the bottoms of the edges of the cover plate 250 to the top of the frame portion 130.

After the above-mentioned fixing method is adopted, the complicated process of one-to-one alignment and installation of the light plates 200 is avoided, and the cover plate 250 is directly fixed onto the framework 100 to complete the installation and fixing of all the light plates 200, which is simple and convenient. Furthermore, the design of the cover plate 250 also avoids the risk that the light plate 200 falls off from the framework 100. In addition, the cover plate 250 covers both the light plate mounting groove 110 and the light plate 200, preventing hot air from flowing out towards the direction of the lamp beads 300 through the gap between the light plate 200 and the framework 100 causing the risk of temperature rise of the lamp beads 300.

At this time, the light plate 200 and the cover plate 250 may be integrally formed. During assembly, it is only needed to install the lamp beads 300 on the cover plate 250 one by one. Of course, the light plate 200 can also be a separate structure from the cover plate 250. When assembling, it is only needed to paste the light plate 200 onto the cover plate 250, so that the number of light plates 200 may be selected depending on the actual situation, so as to meet more usage conditions.

Figure 7:
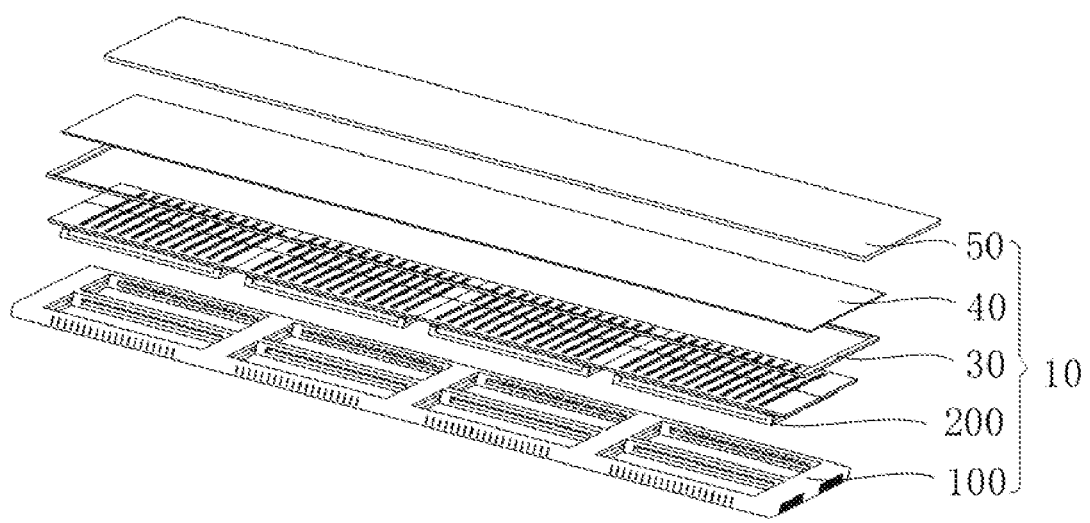
FIG. 7 is a schematic diagram of a display device provided by an embodiment of the present application.

As shown in FIG. 7, the present application further discloses a display device. The display device 10 includes a display panel 50 and the above-mentioned backlight module 20. The display panel 50 may be a TN (Twisted Nematic) display panel, an IPS (In-Plane Switching) display panel, a VA (Vertical Alignment) display panel, or an MVA (Multi-Domain Vertical Alignment) display panel, which is not limited here. The backlight module 20 not only includes the above-mentioned light plate 200, framework 100, lamp beads 300 and cover plate 250, but also includes a sealant 30 and an optical assembly 40. The sealant 30 is fixed to the frame portion 130 of the framework 100 and arranged around the cover plate 250, and the top of the sealant 30 is higher than the top of the lamp beads 300. The edge of the optical assembly 40 is then fixed onto the sealant 30. Finally, the display panel 50 may be directly bonded to the optical assembly 40, or may be fixed onto the sealant 30.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. A backlight module, comprising:
    a framework, comprising at least one light plate mounting groove, wherein at least two sides of the framework corresponding to the at least one light plate mounting groove each define a heat dissipation port, the heat dissipation port running through a respective side wall of the framework;
    at least one light plate, disposed in one-to-one correspondence with and fixed in the at least one light plate mounting groove; wherein an interior of each of the at least one light plate is hollowed out to define a cavity, the cavity being connected with the respective heat dissipation port in the framework; and
    a plurality of lamp beads, disposed on the at least one light plate, and wherein pins of the plurality of lamp beads extend into the cavity;
    wherein the framework and the at least one light plate jointly form a supporting structure of the backlight module.

2. The backlight module of claim 1, wherein the at least one light plate mounting groove comprises a plurality of light plate mounting grooves defined in the framework, and wherein the plurality of light plate mounting grooves are each a through groove running through the framework.

3. The backlight module of claim 1, wherein the at least one light plate mounting groove comprises a plurality of light plate mounting grooves defined in the framework, and wherein the plurality of light plate mounting grooves are each a blind groove that doesn't run through the framework.

4. The backlight module of claim 2, wherein the framework comprises a frame portion and a skeleton portion, wherein the skeleton portion comprises a plurality of crisscross branches, and the frame portion is disposed around the skeleton portion;
    wherein at least two sides of the frame portion define the heat dissipation ports at positions corresponding to the light plate mounting grooves;
    wherein each of the plurality of branches defines an air channel, which runs through two sides of the respective branch corresponding to the respective light plate mounting grooves; and wherein the respective heat dissipation port, air channel, and cavity collectively define a heat dissipation passage.

5. The backlight module of claim 4, wherein four sides of the frame portion each define a heat dissipation port, which is disposed on a side of the frame portion away from the skeleton portion; and wherein the heat dissipation ports are each a porous structure and are arranged in an array;

wherein a side of the frame portion facing towards the skeleton portion is hollowed out to define a hollow portion, the hollow portion corresponding to one side of the cavity.

6. The backlight module of claim 5, wherein a cross-sectional shape of the air channel, a cross-sectional shape of the cavity, and a cross-sectional shape of the hollow portion are identical with each other.

7. The backlight module of claim 5, wherein a cross-sectional area of a side of each heat dissipation port facing towards the respective light plate is greater than a cross-sectional area of a side of the heat dissipation port facing away from the light plate.

8. The backlight module of claim 4, wherein each light plate comprises a top plate, a support member, and a bottom plate; the support member is disposed between the top plate and the bottom plate, and is connected with the top plate and the bottom plate, so that the cavity is defined between the top plate and the bottom plate; wherein the pins of the plurality of lamp beads extend through the top plate and into the cavity.

9. The backlight module of claim 8, wherein a bottom of the bottom plate is flush with a bottom of the framework, and wherein a gap between the bottom plate and the framework is filled with a sealant.

10. The backlight module of claim 8, wherein the top plate, the support member, and the bottom plate are integrally formed as one piece.

11. The backlight module of claim 8, wherein the support member comprises four corner support columns and a central support column; wherein the four corner support columns respectively correspond to four corners of the respective light plate, and connect the four corners of the top plate to the four corners of the bottom plate, respectively;

wherein the central support column is disposed at a center of the respective light plate, connecting a center of the top plate to a center of the bottom plate;

wherein in each light plate a width of the cavity is equal to a distance between two adjacent corner support columns, and wherein a width of the respective air channel is not less than the width of the cavity.

12. The backlight module as claimed in claim 11, wherein a horizontal cross section of each corner support column is a square.

13. The backlight module of claim 8, wherein the backlight module further comprises a cover plate; the top plates of the plurality of light plates are fixed onto the cover plate in an array; the plurality of lamp beads are fixed onto the cover plate, and the pins of the plurality of lamp beads extend through the cover plate and the top plate into cavity;

wherein bottoms of edges of the cover plate abut against a top of the frame portion, and is bonded and fixed onto the frame portion.

14. The backlight module of claim 13, wherein the at least one light plate and the cover plate are integrally formed, and wherein the framework is an integrally formed structure.

15. The backlight module of claim 14, wherein the framework is made of aluminum alloy.

16. The backlight module of claim 4, wherein the plurality of branches are each a hollow structure, and wherein insides of the plurality of branches in the skeleton portion are connected.

17. A backlight module, comprising:
a framework, comprising a plurality of light plate mounting grooves, each being a through groove running through the framework; the framework comprises a frame portion and a skeleton portion; the frame portion comprises a plurality of crisscross branches, and is disposed around the skeleton portion; wherein four sides of the frame portion each define at least one heat dissipation port corresponding to positions of the plurality of light plate mounting grooves; each of the plurality of branches defines at least one air channel running through two sides of the respective branch corresponding to the respective light plate mounting grooves; and wherein the respective heat dissipation port, air channel, and cavity collectively define a heat dissipation channel;
a plurality of light plates, disposed in one-to-one correspondence with and fixed in the plurality of light plate mounting grooves; wherein each of the plurality of light plates comprises a top plate, a support member, and a bottom plate; wherein the support member is disposed between the top plate and the bottom plate, and connected with the top plate and the bottom plate, so that the respective cavity is defined between the top plate and the bottom plate; and
a plurality of lamp beads, disposed on the top plate, and wherein pins of the plurality of lamp beads extend through the top plate into the cavity;
wherein the framework and the at least one light plate jointly form a supporting structure of the backlight module.

18. A display device, comprising a display panel and a backlight module configured to provide backlight for the display panel, the backlight module comprising:
a framework, comprising at least one light plate mounting groove, wherein at least two sides of the framework corresponding to the at least one light plate mounting groove each define a heat dissipation port, the heat dissipation port running through a respective side wall of the framework;
at least one light plate, disposed in one-to-one correspondence with and fixed in the at least one light plate mounting groove; wherein an interior of each of the at least one light plate is hollowed out to define a cavity, the cavity being in communication with the respective heat dissipation port in the framework; and
a plurality of lamp beads, disposed on the at least one light plate, and wherein pins of the plurality of lamp beads extend into the cavity;
wherein the framework and the at least one light plate jointly form a supporting structure of the backlight module.

* * * * *